(12) United States Patent
Guthery

(10) Patent No.: US 7,055,033 B2
(45) Date of Patent: May 30, 2006

(54) INTEGRATED CIRCUIT DEVICES WITH STEGANOGRAPHIC AUTHENTICATION AND STEGANOGRAPHIC AUTHENTICATION METHODS

(75) Inventor: Scott B. Guthery, Newton, MA (US)

(73) Assignee: Microsoft Corporation, Redmond, WA (US)

( * ) Notice: Subject to any disclaimer, the term of this patent is extended or adjusted under 35 U.S.C. 154(b) by 79 days.

(21) Appl. No.: 10/850,839

(22) Filed: May 21, 2004

(65) Prior Publication Data

US 2004/0255131 A1    Dec. 16, 2004

Related U.S. Application Data

(63) Continuation of application No. 09/434,545, filed on Nov. 5, 1999, now Pat. No. 6,779,112.

(51) Int. Cl.
*H04L 9/00* (2006.01)
*H04L 9/32* (2006.01)

(52) U.S. Cl. ............... 713/172; 713/171; 713/173; 713/174; 713/193

(58) Field of Classification Search ............ 713/172, 713/173, 174, 155, 159, 169, 171, 193; 705/41, 705/67
See application file for complete search history.

(56) References Cited

U.S. PATENT DOCUMENTS

| | | | | |
|---|---|---|---|---|
| 5,048,085 A | * | 9/1991 | Abraham et al. | 713/159 |
| 5,721,781 A | * | 2/1998 | Deo et al. | 705/67 |
| 6,038,551 A | * | 3/2000 | Barlow et al. | 705/41 |
| 6,076,164 A | * | 6/2000 | Tanaka et al. | 713/185 |

\* cited by examiner

*Primary Examiner*—Matthew Smithers
*Assistant Examiner*—Courtney Fields
(74) *Attorney, Agent, or Firm*—Lee & Hayes, PLLC

(57) ABSTRACT

Various embodiments pertain to an integrated circuit (IC) device, such as smart cards, electronic wallets, PC cards, and the like, and various methods for steganographically authenticating identities and authorizing transactions based on the authenticated identities.

36 Claims, 6 Drawing Sheets

| Identity | Authentication Structure |
|---|---|
| Holder | PIN |
| Video Store | C1, C3, C2 |
| Bank | C1, C5, C4 |
| Grocery Store | C7, C9, Ko, C2 |

| Transaction | Authorization Expression |
|---|---|
| Rent Movie 124 | (Holder AND Video Store) OR (Holder AND Grocery Store) |
| Return Movie 126 | Video Store OR Grocery Store |

INTEGRATED CIRCUIT DEVICES WITH STEGANOGRAPHIC AUTHENTICATION AND STEGANOGRAPHIC AUTHENTICATION METHODS

RELATED APPLICATION

This application is a continuation of and claims priority to U.S. patent application Ser. No. 09/434,545, filed on Nov. 5, 1999 now U.S. Pat. No. 6,779,112, the disclosure of which is incorporated by reference herein.

TECHNICAL FIELD

This invention relates to integrated circuit (IC) devices such as smart cards, and to methods for using IC devices for authentication purposes. This invention may also be extended to other types of IC devices with limited memory and processing capabilities, such as smart diskettes, electronic wallets, PC cards, and the like. More particularly, the invention relates to methods for using steganographic communication to authenticate authenticatable identities.

BACKGROUND

Authentication systems are used for security purposes to verify the authenticity of one or more parties or entities during a transaction. Traditionally, authentication systems have been manual, involving personal recognition or quick verification of a party via some form of additional identification. One very familiar authentication process occurs when purchasing an item with a personal check. The sales clerk will process the check only if he/she recognizes the person writing the check or if the person presents another piece of identification (e.g., a credit card or driver's license) to verify their authenticity as the specific person who is tendering the check.

Today, many authentication systems are electronic. A familiar electronic authentication system is a common credit card purchase. A card issuer issues a credit card to a consumer to enable the consumer to purchase items on credit. Credit cards that are primarily in use today consist of magnetic-stripe memory cards that have a single magnetic stripe ("mag-stripe") on one side. The magnetic stripe contains information about the card issuer, the consumer, and his/her account.

During a purchase transaction, the consumer presents the credit card to a sales clerk, who authenticates the card before finalizing the transaction. The credit card authentication process is typically performed "online". The sales clerk swipes the card through a reader, which extracts the card data from the magnetic stripe and transmits the data over a network to the card issuer (or a third party contracted to handle authentication requests). The card issuer checks to ensure that the card is still valid (i.e., has not expired), has not been revoked as being lost or stolen, and the corresponding account is below the authorized credit limit. If the authentication is successful, the card issuer returns an approval and the sales clerk completes the transaction. With conventional telecommunications and computerized processes, the entire credit card authentication process is typically handled in an acceptable length of time, such as a few seconds.

Today, there is increasing use of "smart cards" in place of, or in addition to, conventional magnetic stripe cards. A "smart card" is a thin card about the size of a credit card, with a built-in processor that enables the card to modify, or even create, data in response to external stimuli. The processor is a single-wafer integrated circuit (IC) which is mounted on an otherwise plastic card. For this reason, smart cards are often referred to as one class of "integrated circuit cards" or "IC cards".

As smart card technology becomes more pervasive, it paves the way for conducting a variety of new transactions, such as electronic money, which are not available with conventional mag-stripe cards. Smart cards also open up the arena for conducting certain new "offline" transactions, which do not involve validating a card with a central authority. These offline electronic transactions are typically performed without the human intervention, such as from a sales clerk.

Smart cards are equipped with authentication capabilities used to establish the identity of an entity with which it is communicating. An identity can be an individual human being, a business, a piece of computing hardware, software code, a network node, an organizational role, or an accreditation agent. Smart cards also have authorization capabilities to control access to resources stored on the cards or elsewhere. Authentication capabilities are typically in the form of a secret password or cryptographic keys. For a basic introduction of cryptography, the reader is directed to a text written by Bruce Schneier and entitled "Applied Cryptography: Protocols, Algorithms, and Source Code in C," published by John Wiley & Sons with copyright 1994 (second edition 1996).

Smart cards have programs and data that are specifically dedicated to performing these authentication capabilities. These special programs and data define a natural point to attack on the authentication subsystem of a network. Many of the various physical and environmental attacks that are detected are based on identifying and carefully observing the special steps, calculations and hardware that are dedicated to performing the authentication capabilities.

One type of attack is the so-called differential power attack. This attack is directed to observing the power consumption of the smart card and ascertaining the type of processing that takes place through changes in the power that is consumed by the card. For example, when a binary multiplication operation is performed, more power is drawn from the external power supply when the multiplier is "1" than when the multiplier is "0". Thus, by monitoring the power consumption during a time that a card is handling cryptographic material, one can ascertain what mathematical operations are taking place.

Another kind of attack is a so-called timing attack. A timing attack monitors the time that it takes to perform certain operations, e.g. it takes longer to multiply by 1 than it does to multiply by 0. Thus, if authentication times take longer, that may be an indication that there are more 1s in an authentication key than 0s.

In order to counter these types of attacks, authentication keys and protocols have become more complex. This has had an impact on the amount of special purpose software and hardware that must be used to manipulate authentication keys. Ironically, the increase in complexity may actually make a system easier to attack.

Because of the need for special processing and calculations, secret key authentication procedures typically decouple the authentication process from other normal data processing. As a result, the authentication process can be more easily identified, isolated, and subjected to an attack. Attacks such as the "man in the middle" attack and the replay attack are attacks on the authentication procedure and not necessarily on the authentication data. In fact, many of the weaknesses in the authentication systems are in the increasingly complex protocols that are used to conduct the authentication process and not in the explicit revealing of the key material being used.

Accordingly, this invention arose out of concerns associated with providing improved methods and systems for authenticating identities.

SUMMARY

Various embodiments pertain to an integrated circuit (IC) device, such as smart cards, electronic wallets, PC cards, and the like, and various methods for authenticating identities.

In accordance with one or more embodiments, an IC device has a memory and a processor and can maintain an identity authentication table in the memory to hold an arbitrary number of identities. The identity authentication table correlates identities with authentication structures. Each identity has a unique authentication structure.

In one embodiment, each authentication structure is defined by a collection of data-handling or data processing commands. These commands are the types of commands that are normally associated with data processing that is performed by the IC device. These commands are not inherently functional to provide any authenticating capabilities. The commands can be arranged in a unique manner so that each identity becomes associated with a unique set of defined commands. Arrangements can be embodied in the particular types of commands that are selected, the order of selected commands, or both, to name just a few.

When an identity is authenticated, a dialog takes place between the IC device and the identity. The dialog contains the authentication structure for an identity. If the authentication structure matches the identity offering the structure, then the identity is authenticated. By using normal, expected commands, the fact that authentication is taking place is hidden from any observers. Thus, preferred embodiments use steganographic communication—i.e. communication in which the actual message, while present and observable, is disguised, to authenticate identities.

DETAILED DESCRIPTION

Figure 1:
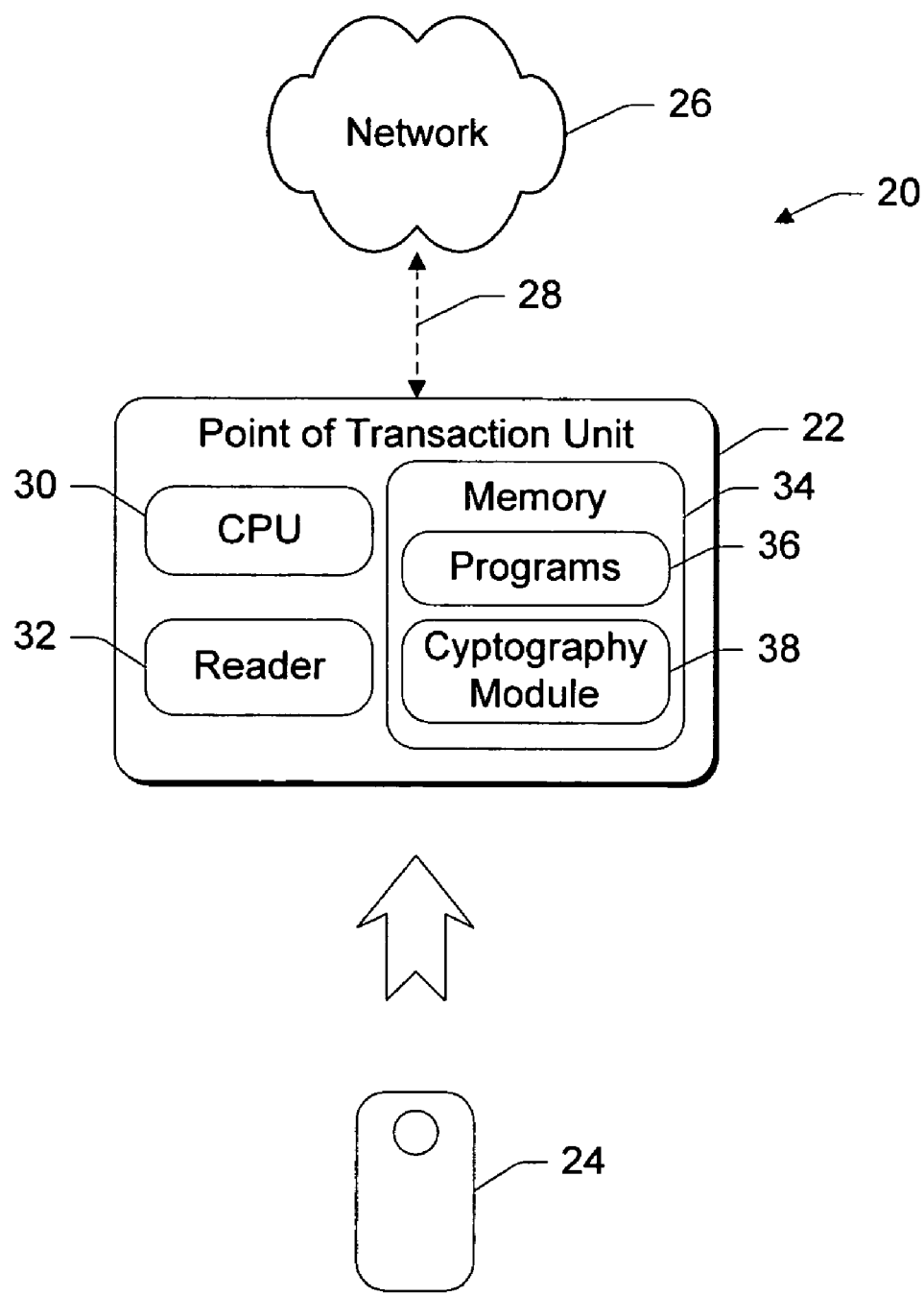
FIG. 1 is a block diagram of a point-of-transaction system used to authenticate an IC device.

FIG. 1 shows a system 20 having a point-of-transaction unit 22 (also referred to as a sending/receiving unit) and a multi-purpose integrated circuit (IC) device 24. The point-of-transaction unit 22 may be a standalone device, in which the IC device is called upon to perform offline verification. Alternatively, the point-of-transaction unit 22 may be connected to a network 26 via a cable or wireless connection represented by dashed line 28 to enable online verification or to facilitate authorization procedures initiated by the IC device. The network 26 can be a data communications network including a wire-based network, such as an enterprise network (e.g., a local area network for a business) or a public network (e.g., the Internet), and a wireless network (e.g., satellite network). The network 26 can also be implemented as a telephone network, or an interactive television network, or any other form for linking the point-of-transaction unit 22 to an external source of information.

The point-of-transaction unit 22 has a central processing unit (CPU) 30, a reader 32 to interface with the IC device 24, and memory 34. Programs 36 (which include an authentication program) and a cryptography module 38 are stored in memory 34 for execution on the CPU 30.

The point-of-transaction unit 22 is representative of many different types of computerized devices that are provided for interaction with users. The point-of-transaction unit 22 may take the form of a general-purpose computer, an ATM (automated teller machine), a kiosk, a vending machine, an automated entry gate, an electronic ticket apparatus, a set top box, and the like. The point-of-transaction unit 22 controls the information transfer to and from the IC device 24.

Depending upon the configuration and operating environment of the point-of-transaction unit 22, one or more software applications 36 may execute on the unit. A user's home or work computer typically executes many different applications. Conversely, a computer implemented as a kiosk, ATM, or vending machine might only execute one specific application.

The IC device 24 is illustrated as a multi-purpose smart card or IC card. The multi-purpose smart card contains various resources that might be used by, or in support of, an application executing on the point-of-transaction unit 22. Among these resources are authentication and cryptography capabilities. The IC card also performs rudimentary cryptographic functions, including encryption, decryption, signing, authentication. The IC card stores an authentication table that correlates authenticatable identities with one or more authentication structures that can be used to authenticate identities. The IC card may also contain resources in the form of electronic assets, which represent value. For instance, the IC card might store assets in the form of electronic entertainment tickets, travel reservations, service contracts, medical prescriptions, government entitlement provisions, electronic cash, public transportation tokens, and so one. With such diverse resources, the IC card 24 is capable of supporting multiple applications in different environments.

One exemplary implementation of an architecture that facilitates multi-use IC cards is described in co-pending U.S. patent application Ser. No. 08/647,199, entitled "System And Method For Configuring And Managing Resources On A Multi-Purpose Integrated Circuit Card Using A Personal Computer", which was filed Mar. 11, 1996 in the names of Doug Barlow, Blair Dillaway, Barbara Fox, Terry Lipscomb, and Terrence Spies. This application is assigned to Microsoft Corporation and is hereby incorporated by reference.

It is noted that, in addition to the illustrated smart cards, the IC device might be embodied in other forms, such as an electronic wallet, a personal digital assistant, a smart diskette (i.e., an IC-based device having a form factor and memory drive interface to enable insertion into a floppy disk drive), a PC card (formerly PCMCIA card), and the like. Generally, the IC device 24 is characterized as an electronic device with limited processing capabilities and memory wherein large size number crunching is impractical. However, aspects of this invention may be utilized with IC devices that do not meet this limitation, as well as to verification of non-computerized items, such as conventional credit cards. For purposes of continuing discussion and within the context of the illustrated implementation, the terms "IC device", "IC card", and "smart card" will be used interchangeably to reference the IC device 24.

The system 20 implements software that enables authentication of the point-of-transaction unit 22, the IC card 24, and any application running on the unit 22 and IC card 24. In addition, the system software enables authentication of the user to the IC card 24.

In one exemplary implementation, the system software includes a software application interface which executes on the point-of-transaction unit 22 to prevent possible covert attacks from malicious software applications which attempt to gain unauthorized access to resources on the IC card. The application interface implements the application and provides services which facilitate access to the resources on the IC card 24, without allowing the application itself to directly access the card-based resources. The application interface is implemented as a service layer for the operating system and is securely integrated with the operating system through mutual authentication.

The application interface is preferably an application program interface with a set of functional APIs that can be called by the application to support a particular functionality requested by the application. One exemplary set of APIs are described in the above incorporated U.S. patent application Ser. No. 08/647,199.

Exemplary IC Device Implementation

Figure 2:
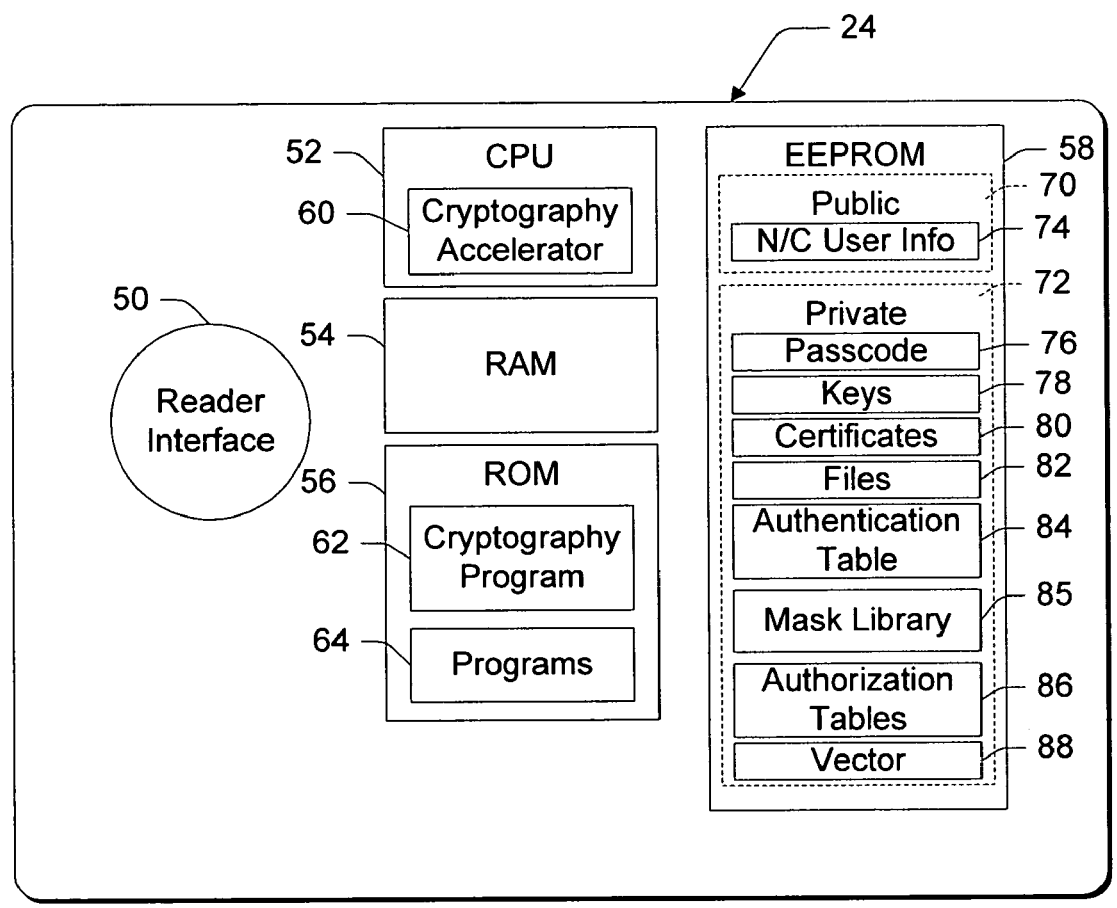
FIG. 2 is a block diagram of an IC device embodied as a smart card.

FIG. 2 shows an exemplary smart card implementation of the IC device 24. The smart card has a reader interface 50 for coupling to a card reader, a CPU or processor 52, a volatile rewritable RAM (Random Access Memory) 54, a ROM (Read Only Memory) 56, and an persistent reader/write memory such as EEPROM (Electrically Erasable Programmable ROM) 58. A multi-bit bus (not shown) connects the components.

The smart card 24 is configured with cryptography acceleration circuitry 60, shown integrated with the CPU 52, which streamlines cryptography computations to improve speed. The cryptography accelerator 60 can alternatively be implemented independently of the CPU.

The ROM 56 stores a cryptographic program 62 that executes on the CPU 52 in conjunction with the cryptography accelerator 60 to perform certain cryptographic functions, including encryption and decryption of data. As an example, the cryptographic program 62 can encrypt and decrypt short messages using asymmetric key cryptography, such as RSA, and symmetric key cryptography, such as DES (Data Encryption Standard). The cryptographic program 62 might also be capable of generating and destroying cryptographic keys, such as symmetric keys used in the bulk encryption/decryption of a message. The symmetric keys are typically "sessional," meaning they are generated for each transaction and then subsequently destroyed. Preferably, the encryption capabilities of the smart card are not used in the authentication of the identities that interact with the card. Rather, only the data that is exchanged between the identities outside of the authentication procedure is encrypted, if necessary or desirable.

One or more programs 64 are also stored in ROM 56. These programs are run on the CPU 52 to facilitate sessions with corresponding programs on the point-of-transaction unit 22. The programs preferably include an authentication program that is configured to interact with authentication structures that are discussed in more detail below.

The EEPROM 58 is partitioned into a public storage 70 and a private storage 72. The public storage 70 contains non-confidential user information 74, such as medical data or driver's license information. This information can be distributed freely by the smart card 24, without any special security protocol or the need for the user to enter a personal passcode.

The private storage 72 maintains information to which the user wishes to control access. The processor 52 only retrieves information from the private storage 72 upon authentication by the user and/or other entities. One technique for authenticating the user is to require the user to enter a passcode into the point-of-transaction unit 22. The passcode is passed through the card reader 32 to the card I/O port 50, and to the card CPU 52. The CPU 52 compares the entered passcode to a passcode 76 stored in EEPROM 56, and authenticates the user if the entered and stored passcodes match.

The private storage 72 of EEPROM 58 stores cryptographic keys 78 to facilitate secure data exchange. As one example, the smart card might store two asymmetric pairs of public and private cryptography keys—a signing pair and a data exchange pair.

The IC card is designed to avoid exposing the private keys. The encryption keys are never directly accessible and the asymmetric private signing and exchange keys are not permitted to leave the IC card under any circumstances. In this manner, the IC card prevents a foreign application from ever inadvertently or intentionally mishandling the keys in a way that might cause them to be intercepted and compromised.

Files 82 are also stored in the private segment 72 of the EEPROM 58. These files contain data that is used by the programs during transactions. For instance, the files 82 might represent electronic assets such as tickets, tokens, e-cash, government entitlements, or a pointer to a source of value. The files might alternatively hold travel bonus awards such as air miles or hotel stays, or frequent purchase plans such as video rental or gas purchase. The files might further hold medical prescriptions and reservations.

The private segment 72 of EEPROM 58 also holds an authentication table 84, and can optionally contain one or more authorization tables 86, and an authentication vector 88. The authentication table 84 holds a list of authenticatable identities, such as people, entities, agencies, code, hardware, and so on, and correlates authentication structures with individual authenticatable identities. The authorization tables 86 can determine authorization as a Boolean expression of authenticatable identities listed in the authentication table 84. The authorization tables 86 are associated with the files 82. The authentication vector 88 can list the identities that are currently authenticated by the card.

Identity Authentication Table

The multi-purpose smart card 24 can be used in many different ways and for many diverse environments. The smart card 24 might be used to rent a movie in one case and to withdraw money from a bank in another case. The same card might then be used to purchase groceries or to redeem flight miles.

In each environment, the smart card 24 performs various authentication procedures to verify the authenticity of the participating identity or identities. Preferably, these authentication procedures are independent of any encryption/decryption procedures and draw upon the fundamentals of steganographic communication. The smart card 24 is designed to keep track of an arbitrary number of identities (limited only by the resources of the card). Each identity has an associated authentication structure that is used by the smart card for authentication purposes.

Figures 3, 4, 5:
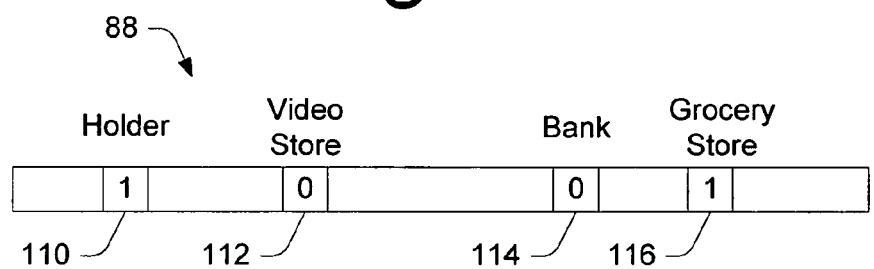
FIG. 3 illustrates an identity authentication table maintained in the IC device.
FIG. 4 illustrates an authentication vector maintained in the IC device.
FIG. 5 illustrates an authorization table maintained in the IC device.

FIG. 3 shows an identity authentication table 84 that lists the identities and correlates with them authentication structures. More particularly, the authentication table 84 has an identity field 90 and an authentication structure field 92.

The authentication table 84 holds one or more identities, depending upon the number of uses for the smart card. Identities may be added to and removed from the card by simply altering this table.

For example, suppose the smart card 24 is configured to engage in bank transactions (e.g., withdraw, transfer, etc.), purchase groceries, and rent movies. The authentication table 84 holds four identities: a card holder 98, a video store 100, a bank 102, and a grocery store 104. The IC card 24 authenticates the card holder 98 using a PIN protocol in which the holder enters his/her passcode number. The IC card 24 authenticates the bank using an authentication structure that is associated with the bank. Similarly, the IC card 24 authenticates the video store and grocery store by using the authentication structures that are each associated with them.

Authentication Structures

Various embodiments utilize the principles of steganographic communication to authenticate various identities. Steganographic communication is a method of communication that hides the existence of the communication. One simple example of steganographic communication is using the first letters of all the sentences in a text to form a message. The message itself is in the clear, but its existence or presence is hidden. This is different from cryptographic communication. There, the message is unreadable and it is clear that it is not intended to be read by anyone other than a person with an appropriate decrypting tool.

In accordance with various embodiments, communication is established between one or more identities, either or both of which are authenticatable. In the discussed embodiment, a smart card is configured to authenticate an identity with which it is in communication. It is to be understood, however, that any identities that are authenticatable can implement one or more of the described embodiments, and that these identities are not necessarily limited to smart cards and their associated authenticatable identities. A portion of the communication that takes place between the identities is dedicated to steganographic communication. Using the steganographic communication, at least one and possibly both identities are authenticated. The steganographic communication contains authentication structures that are used by the authenticating identity (i.e. the smart card) to authenticate the identity with which it is associated.

Authentication Structure-Command Embodiment

A smart card generally accepts commands from a terminal in which it is inserted, processes the commands, and returns results to the terminal. Prior art smart cards typically includes a number of commands that, together with specific stored key material, are used to authenticate both the terminal into which it has been inserted and the cardholder. Some exemplary commands include those specified by the ISO 7816-4 and ISO 7816-8 commands such as GET RANDOM, VERIFY CHV, and EXTERNAL AUTHENTICATE. Each of these commands is used to move authenticating information related to the stored key material between the terminal and the card. In other words, the functionality of these commands is inherently related to authentication.

In one embodiment, commands that are not specifically constructed to perform authentication are used for authentication purposes. Examples of such commands include routine data processing and data handling commands. These commands can be used to establish the identity of both the terminal and the cardholder. In the context of smart card use, such commands can include the following ISO 7816-4 and ISO 7816-9 commands: SELECT FILE, READ FILE, CREATE FILE, WRITE RECORD, and DELETE FILE to name just a few.

As an example, consider the following: A terminal issues a SELECT FILE command on a file ABC that is held by the smart card. The card responds with a status code of 0x6108 (meaning that there are 8 bytes of information available about file ABC—a fact known only by the smart card and the terminal). The terminal then issues a GET RESPONSE command for 4 bytes of the available information. The steganographic communication constituting the authentication is embodied in the following aspects of this communication: (1) the terminal knew to ask for a particular file ABC, and (2) the terminal knew to request one half of the available information about that particular file. In this example, no secret key has been used and the authentication is hidden in the normal data processing commands. Thus, to an outsider looking to break into the authentication, this transaction looks like a normal data processing transaction using nothing other than expected data processing commands.

There are a number of ways to set up steganographic communication between one or more authenticatable identities. FIG. 3 shows an authentication table that illustrates but one way to do this. There, each authenticatable identity has an associated authentication structure associated therewith. Specifically, the video store has the structure C1, C3, C2; the bank has the structure C1, C5, C4; and the grocery store has the structure C7, C9, Ko, C2. Each of these structures is a unique, entity-specific organization. The prefix "C" represents "command" and the numerical suffix represents a command number. The "K" prefix represents a false cryptographic command or operation. This can be interposed in a steganographic authentication to emulate a real cryptographic command so that to an outside observer, it looks as if a standard authentication is taking place. In this example, the steganographic communication can be embodied in the selection of the defined commands and/or the order of the defined commands. For example, in order to authenticate the video store the commands C1, C3, and C2 (either in that order or not) must be received during the portion of the communication that is dedicated to steganographic communication.

In this example, the commands have an apparent function that is not associated with authenticating an identity. For example, the commands can be simple, unencrypted READ, WRITE, and DELETE commands. Yet, collectively the commands have a hidden function that is associated with authenticating one or more identities. The hidden function is preferably disguised by the predefined structure of the commands.

In smart card embodiments, a number of aspects of smart card commands can be used to carry authenticating information steganographically between the card and terminal:
1. The commands used with a particular data object on the card.
2. The order in which commands are applied to a particular data object.
3. The selection, value, and format of data sent to or returned by the card.
4. The status and error codes returned by the card.

In order to disguise the fact that steganographic authentication is being used, a faux or false cryptographic protocol can be used. The false protocol can itself be used to carry steganographic authentication information. For example, an integral part of some authentication protocols is the retrieval of a random number from the smart card. Rather than being a random number, this number could contain parameters of the steganographic procedure that the card wishes the terminal to execute. If the cryptographic protocol that the card and the terminal are appearing to execute requires that the terminal return data to the card after it has retrieved a random number, then this data need bear no cryptographic relationship to the retrieved number. On one hand, the number may contain the beginning of the steganographic protocol. On the other hand, the returned number may itself be a random number created by the terminal or the encryption of the number supplied by the card with an arbitrary key. The latter two cases could invite an intruder to engage in a futile attack on what appears to be a cryptographic authentication protocol.

The commands and command data used for authentication can also be mixed in with or actually part of commands that are being used to perform a necessary data processing task. For example, what appears to be checksum digits appended to normal data processing commands can actually betoken the identity of the entity sending the message. Alternately, the order in which necessary data is sent to or returned from the card can carry authenticating information.

Authentication Vector

The smart card 24 can maintain an optional authentication vector 88 in EEPROM 58. The authentication vector 88 tracks which identities are currently authenticated by the card at any given time.

FIG. 4 shows an authentication vector 88 implemented as a bit array. The Is vector 88 has one or more bits assigned or associated with various identities that may be authenticated by the card. Continuing with the example identities of FIG. 3, one bit in the authentication vector 88 is associated with each identity (i.e., card holder, a video rental store, a bank, and a grocery store). FIG. 3 shows this scenario by bits 110, 112, 114, and 116.

The participants' associated bit is initially set to one binary value, such as "0". When the smart card 24 properly authenticates an identity, it resets the corresponding bit to the other binary value, such as "1". FIG. 3 shows the case in which the user and grocery store have been authenticated, as indicated by bits 110 and 116 being reset to binary value "1". The bank and video store have not been authenticated, as indicated by bits 112 and 114 being set to binary value "0".

The identity authentication table 84 and authentication vector 88 combine to track an arbitrary number of identities (limited only by the resources of the card). Identities do not have to be aliased or reused. Moreover, data access policies, as set forth in the authorization tables 86, can expressed directly in terms of the identities and are independent of other features of the card such as data location.

Authorization Tables

Once the card has authenticated one or more identities, it may engage in a transaction if the appropriate identities supporting the desired transaction are authenticated. The smart card 24 can maintain one or more optional authorization tables 86 in the EEPROM 58 that set forth whether a particular transaction can be undertaken given a set of authenticated identities. The authorization tables 86 can be stored in association with particular files 82 so that one authorization table indicates how the transaction of the associated file can be performed.

FIG. 5 shows an authorization table 86 that is associated with a file used to facilitate renting a movie. The authorization table 86 associates movie rental transactions 120 with an authorization expression 122 represented as a Boolean function of authenticatable identities.

Suppose the movie rental file defines two transactions: a rental transaction 124 and a return transaction 126. The rental transaction 124 facilitates renting a movie, and may involve using the card to obtain a physical copy of the movie cassette or obtaining access keys, which can be stored on the card, to enable a receiver to decrypt a video stream carrying the movie. The return transaction 126 facilitates return of the movie, either the physical return of the video cassette or verifiable destruction of the decryption key. These transactions may be performed with various video rental locations, including the video store and the grocery store.

Authorization for each transaction is a function of authenticatable identities. The rental transaction 124 is permitted if the card has authenticated both the card holder and at least one of the video rental locations (i.e., the video store or the grocery store). This authorization is represented by the following Boolean expression:

Rental=(Holder AND Video Store) OR (Holder AND Grocery Store)

Requiring two authenticatable identities ensures that the party authorizing expenditure is truly the card holder, and that the party offering the video movie is truly the video store or grocery store. Absent one of these identities, the card aborts the transaction.

The return transaction 126 does not involve authenticating the identity of the holder because the card (or video owner) need not be concerned with who returned the video, only that it is returned. For instance, a relative of the card holder may use the card to return the movie or access keys to the movie. The card only needs to know if it is returning the movie to the proper place (i.e., the video store or grocery store). Accordingly, authorization for the return transaction only requires authentication of either the video store or the grocery store, as follows:

Return=Video Store OR Grocery Store

It may take an excessive amount of time and card-resident computer program code to provide for the evaluation of an arbitrary Boolean expression on a smart card. Accordingly, one preferred technique is to transform the Boolean expression into a disjunctive normal form and to store this representation of the Boolean expression on the card. A disjunctive normal form is a Boolean expression of the form:

(A AND B AND . . .) OR (C AND D AND . . .) OR (E AND F AND . . .) OR . . . OR (Y AND Z AND . . .)

It is well known that any Boolean expression can be transformed into this form and that there are ways to minimize the number of terms in the resulting expressions. Therefore, by performing some computing off the card and before the card is personalized, on card space can be saved and on card computation time minimized for the handling of arbitrary Boolean expressions.

Alternatively, a conjunctive normal form may be used as well:

(A OR B OR . . .)AND (C OR D OR . . .) AND (E OR F OR . . .) AND . . . AND (Y OR Z OR . . .)

The disjunctive form is slightly favored because it would be shorter on average over the kinds of Boolean expressions that are of interest in controlling access in smart cards as compared to the conjunctive form.

Authentication and Authorization Process

Figure 6:
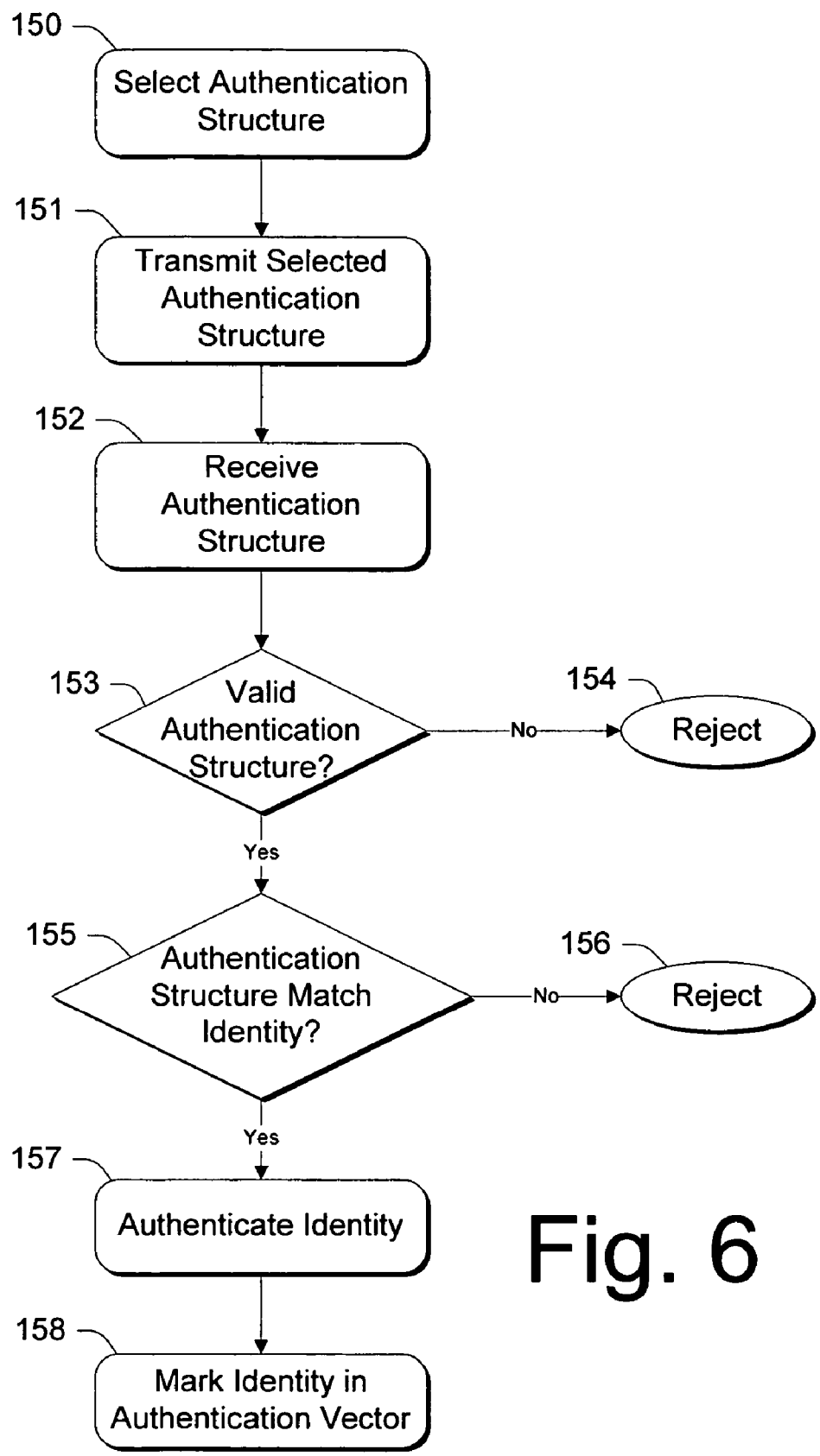
FIG. 6 is a flow diagram showing steps in a method for authenticating an identity to the IC device.

FIG. 6 shows steps in a method for authenticating an identity. At step 150, the identity selects an authentication structure that is uniquely associated with it. Preferred authentication structures comprise a set of data processing or data handling commands that are arranged into a structure that has a hidden purpose. Next, the identity and the smart card enter into an unencrypted dialog into which is incorporated the selected authentication structure. To enter into the dialog, the identity transmits the authentication structure to the smart card at step 151, and the smart card receives the authentication structure at step 152. The smart card then engages in an evaluation process to determine first whether the authentication structure is valid (step 153) and if so, whether the authentication structure matches the identity that sent it (step 155). If, at step 153 the smart card determines that the authentication structure is not a valid one, then the smart card can return an "Invalid Authentication" message at step 154, or take whatever action is programmed to take place in such event, e.g. terminate the transaction. Similarly, if the authentication structure is a valid one but does not match the identity, then the smart card can return an "Invalid Authentication" message at step 156. Evaluation of the authentication structures takes place by evaluating the hidden purpose behind the otherwise normally-appearing data handling or processing commands.

If the authentication structure matches the transmitting identity, then the smart card authenticates the identity at step 157 and can mark the identity in the authentication vector at step 158.

Figure 7:
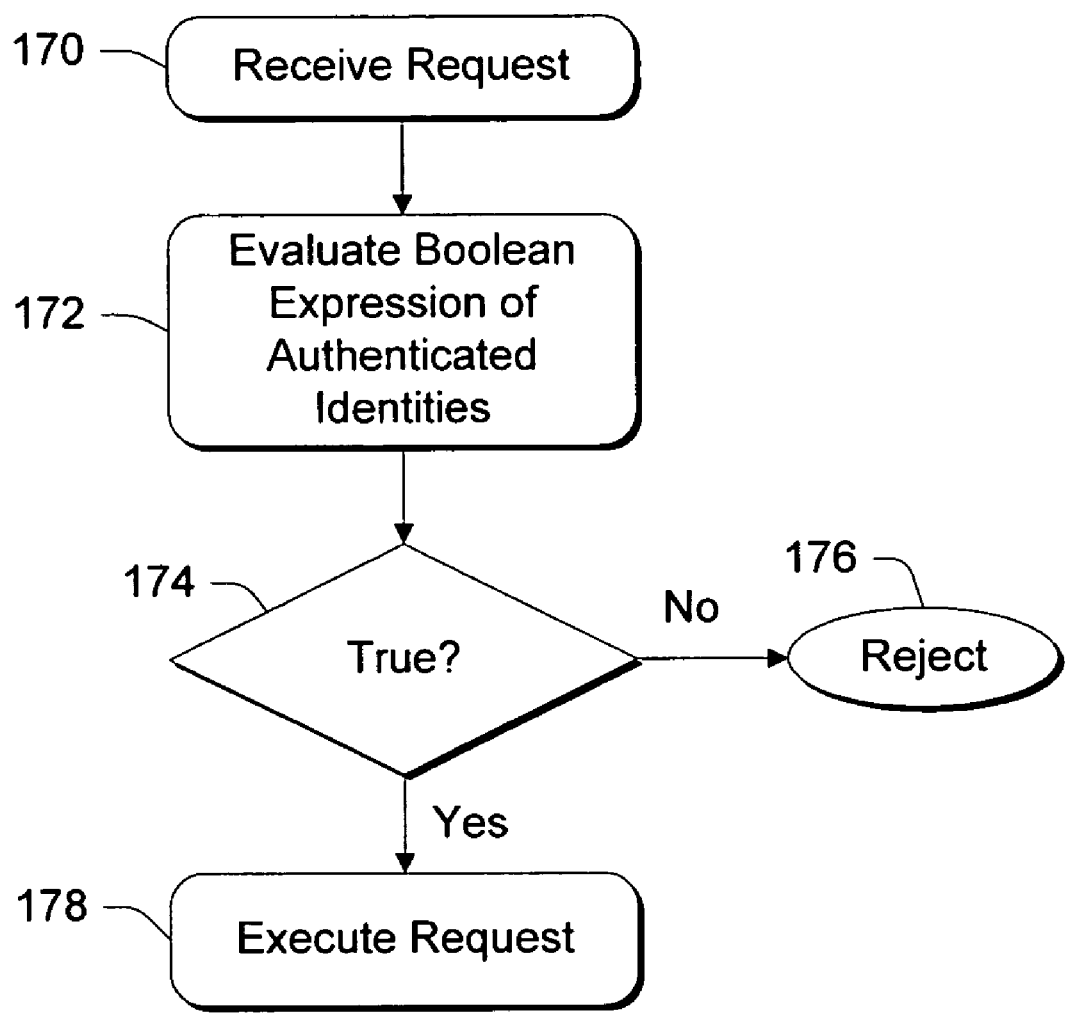
FIG. 7 is a flow diagram showing steps in a method for authorizing a particular request.

FIG. 7 shows steps in a method for authorizing a particular transaction. At step 170 in FIG. 7, the smart card receives a request for an operation, along with any identity with which the card may be involved. The card looks up the authorization table 86 associated with the requested operation (e.g., the table for authorizing movie rental), and evaluates the Boolean expression assigned for that operation given the current set of authenticatable identities referenced in the authentication vector 88 (step 172).

If the expression proves false (i.e., the "no" branch from step 174), the smart card 24 rejects the operation (step 176 in FIG. 7). On the other hand, if the expression is true (i.e., the "yes" branch from step 174), the smart card executes the operation (step 178).

Authentication Network

It is advantageous for the smart card to be able to economically store and execute a representation of the authentication process. Many techniques are available to represent processes consisting of conditional and data-dependent steps including ladder diagrams, logic models, logic charts, causal models, logical frameworks, performance frameworks, finite state diagrams, and Petri nets. Using any of these, and possibly other representations, the smart card can use the communication coming from the identity to be authenticated to follow the diagram step-by-step.

The path in an authentication network eventually reaches a state that either authenticates or rejects the identity seeking authentication. If an authentication state is reached, then the identity is successfully authenticated. If a reject state is reached, then the identity is not authenticated. The secret that is shared between the smart card and the authenticatable identity is at least one path through the authentication network that leads to an authenticate state with the identities' name on it.

Figure 8:
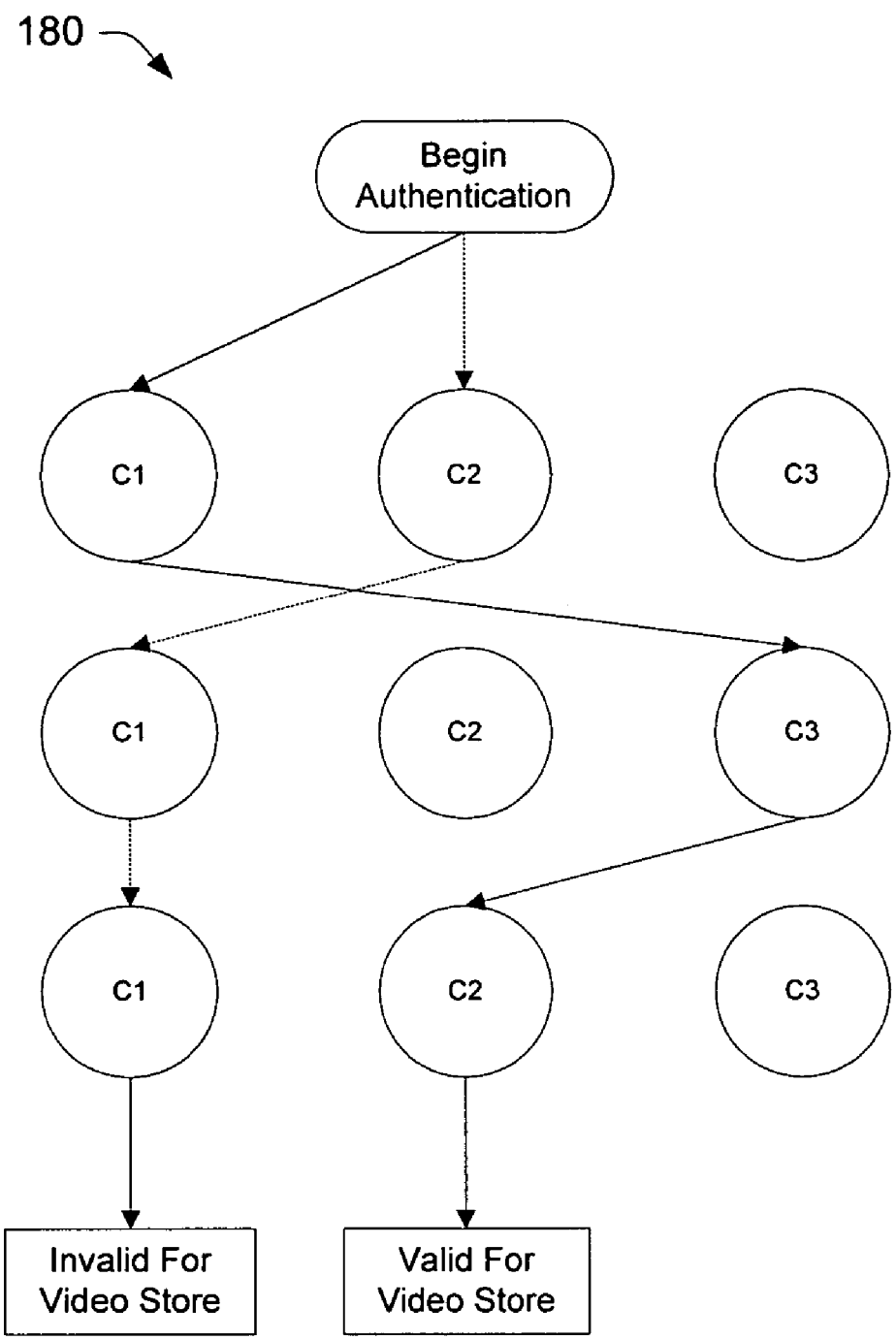
FIG. 8 illustrates an authentication network maintained in the IC device.

Consider the example set forth in FIG. 8. There, a portion of an authentication network is set forth at 180. This particular network has three levels, each of which corresponds to one of the commands set forth in FIG. 3. At the bottom of the authentication network is an authentication state for the video store. This state can only be reached, in this example, by following a path through the authentication network that includes the commands C1, C3, and C2 (in that order). Any other path leads to an invalid or reject state, meaning that the video store cannot be authenticated.

Advantages of steganographic authentication include its ability to blend in with other normal commands that comprise the information exchange protocol that takes place between first and second identities such as a smart card and an authenticatable identity. Thus, it is not readily identifiable as an authentication routine to an outside observer. In addition, the incorporation of false cryptographic commands or operations provides an added degree of deception that can mislead an individual who is attempting to break the authentication protocol. Steganographic authentication is easier to administer and implement because it need not have any special dedicated cryptographic hardware or software. Other advantages will be apparent to those of skill in the art.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An integrated circuit device comprising:
 a processor;
 one or more computer-readable media;
 computer-readable instructions resident on the one or more computer-readable media which, when executed by the processor, implement a method comprising:
 selecting a set of defined commands each of which has an inherent function that is not associated with authentication;
 transmitting the selected set of defined commands between the integrated circuit device and a receiving/sending unit effective to enable the receiving/sending unit to authenticate the integrated circuit device using the transmitted set of defined commands.

2. The integrated circuit device of claim 1, wherein authentication can take place based on an order of the set of defined commands, and authenticating based upon said order.

3. The integrated circuit device of claim 1, wherein authentication can take place based on which commands are used to define the set of commands.

4. The integrated circuit device of claim 1, wherein said authentication can take place based on:
 which commands are used to define the set of commands; and
 an order of the set of defined commands that are used.

5. The integrated circuit device of claim 1, wherein the functions are associated with data handling.

6. The integrated circuit device of claim 1, wherein said transmitting further comprises transmitting at least one false cryptograpbic command designed to emulate an actual cryptographic operation.

7. An integrated circuit device comprising:
 a processor;
 one or more computer-readable media;
 computer-readable instructions resident on the one or more computer-readable media which, when executed by the processor, implement a method comprising:
 transmitting a plurality of data processing commands between a first identity that is to be authenticated and a second identity that is to authenticate the first identity, the data processing commands having an apparent data processing function and a hidden function, the apparent data processing function not being associated with authenticating the first identity, the hidden function being associated with authenticating the first identity.

8. The integrated circuit device of claim 7, wherein the hidden function defines a sequence of commands that are associated with the first identity.

9. The integrated circuit device of claim 7, wherein the hidden function defines command types tat are associated with the first identity.

10. The integrated circuit device of claim 7, wherein the hidden function defines command types that are associated wit the first identity and used in connection with a particular data object.

11. The integrated circuit device of claim 7, wherein the hidden function is selected to operate upon data in a manner that is known only to the first and second identities.

12. The integrated circuit device of claim 11, wherein operation of the hidden function is associated with particular data selected by the apparent data processing function that is associated with a hidden function.

13. The integrated circuit device of claim 7, wherein one of the first and second identities comprises a smart card.

14. An integrated circuit device comprising
a processor;
one or more computer-readable media;
computer-readable instructions resident on the one or more computer-readable media which, when executed by the processor, implement a method comprising:
establishing communication between a pair of authenticatable identities,
one of which is to be authenticated by the other;
allocating a portion of the communication to steganographic communication; and
authenticating the one identity using the steganographic portion of the communication.

15. The integrated circuit device of claim 14 wherein said method further comprises defining the steganographic portion of the communication using one or more data processing commands.

16. The integrated circuit device of claim 14 wherein said method further comprises defining the steganographic portion of the communication using a plurality of data processing commands.

17. The integrated circuit device of claim 16, wherein said defining comprises arranging the data processing commands into a predefined structure, and wherein said authenticating comprises recognizing the predefined structure.

18. The integrated circuit device of claim 17, wherein the predefined structure comprises a data processing command order.

19. The integrated circuit device of claim 17, wherein the predefined structure comprises a predefined number of data processing commands.

20. The integrated circuit device of claim 17, wherein the predefined structure comprises data processing command types.

21. The integrated circuit device of claim 14, wherein one of the identities comprises the integrated circuit device.

22. An integrated circuit device comprising:
a processor;
one or more computer-readable media;
computer-readable instructions resident on the one or more computer-readable media which, when executed by the processor, implement a method comprising:
defining a plurality of unencrypted authentication structures, each authentication structure containing at least one command;
associating each authentication structure with an identity that is to be authenticated;
establishing an unencrypted dialog between a pair of identities;
incorporating an authentication structure into the unencrypted dialog, the authentication structure being capable of being evaluated for authenticating an identity if the authentication structure corresponds to the identity seeking to be authenticated.

23. The integrated circuit device of claim 22, wherein the unencrypted authentication structures compose one or more data processing commands.

24. The integrated circuit device of claim 22, wherein the defining of the authentication structures comprise arranging a plurality of data-processing commands into defined arrangements for each authentication structure.

25. The integrated circuit device of claim 24, wherein some of the defined arrangements have different collections of data-processing commands.

26. The integrated circuit device of claim 24, wherein the defined arrangements have different sequences of data-processing commands.

27. The integrated circuit device of claim 24, wherein some of the defined arrangements different collections of data-processing commands, and all of the defined arrangements have different sequences of data-processing commands.

28. The integrated circuit device of claim 22, wherein said method further comprises incorporating a false cryptographic operation into the unencrypted dialog, the false cryptographic operation being designed to emulate a real cryptographic operation.

29. The integrated circuit device of claim 22, wherein the authenticating is performed by the integrated circuit device.

30. An integrated circuit device comprising:
a processor;
one or more computer-readable media; and
an authentication table stored in the one or more computer-readable media to hold a plurality of identities and to correlate data-processing commands with each identity, the data-processing commands for each identity having a unique identity-specific organization which, when recognized, can be used to authenticate an associated identity.

31. The integrated circuit device of claim 30, wherein each identity-specific organization is embodied as a specific order of data-processing commands.

32. The integrated circuit device of claim 30, wherein each identity-specific organization is embodied as a specific collection of data-processing commands.

33. The integrated circuit device of claim 30 embodied as a smart card.

34. An integrated circuit device comprising:
one or more computer-readable media; and
steganographic authentication means stored in the one or more computer-readable media and configured for steganographically authenticating one or more authenticatable identities.

35. The integrated circuit device of claim 34, wherein the steganographic authentication means comprises a collection of data processing commands.

36. The integrated circuit device of claim 34, wherein the steganographic authentication means comprises a collection of data processing commands arranged into a predefined order.

* * * * *